US008202500B2

(12) United States Patent
Fahs, II et al.

(10) Patent No.: US 8,202,500 B2
(45) Date of Patent: Jun. 19, 2012

(54) PROCESSES AND USES OF DISSOCIATING MOLECULES

(75) Inventors: Richard W. Fahs, II, Woodstock, CT (US); Matthew D. W. Fahs, Woodstock, CT (US)

(73) Assignee: Fahs Stagemyer, LLC, Woodstock, CT (US)

(\*) Notice: Subject to any disclaimer, the term of this patent is extended or adjusted under 35 U.S.C. 154(b) by 25 days.

(21) Appl. No.: 12/861,524

(22) Filed: Aug. 23, 2010

(65) Prior Publication Data

US 2011/0206593 A1    Aug. 25, 2011

Related U.S. Application Data

(60) Provisional application No. 61/236,592, filed on Aug. 25, 2009, provisional application No. 61/306,281, filed on Feb. 19, 2010, provisional application No. 61/315,262, filed on Mar. 18, 2010.

(51) Int. Cl.

| A61L 2/00 | (2006.01) |
|---|---|
| A61L 9/00 | (2006.01) |
| A62B 29/00 | (2006.01) |
| A62D 3/00 | (2007.01) |
| A62D 3/10 | (2007.01) |
| B01D 53/34 | (2006.01) |
| C02F 1/00 | (2006.01) |
| C02F 1/30 | (2006.01) |

(52) U.S. Cl. ............. 423/210; 423/648.1; 422/4; 422/5; 422/120; 422/121; 422/122; 422/129; 210/600; 588/300; 588/301; 204/157.15; 204/164

(58) Field of Classification Search .................. 423/210, 423/648.1; 422/4, 5, 120, 121, 122, 129; 210/600; 588/300, 301; 204/157.15, 164
See application file for complete search history.

(56) References Cited

U.S. PATENT DOCUMENTS

| 5,211,923 | A | * | 5/1993 | Harkness et al. ............. 423/220 |
|---|---|---|---|---|
| 7,713,417 | B2 | | 5/2010 | Sutton |
| 2003/0230537 | A1 | | 12/2003 | Taoda |
| 2004/0195088 | A1 | * | 10/2004 | Rostaing et al. ............. 204/164 |
| 2008/0179178 | A1 | | 7/2008 | Cabello |
| 2010/0023377 | A1 | | 1/2010 | Sheridan |
| 2010/0200515 | A1 | | 8/2010 | Saien |
| 2010/0224480 | A1 | | 9/2010 | Bloess |

FOREIGN PATENT DOCUMENTS

| EP | 1041042 | 10/2004 |
|---|---|---|
| GB | 2356859 | 6/2001 |
| WO | 2006027659 | 3/2006 |
| WO | 2006134149 | 12/2006 |
| WO | 2010099854 | 9/2010 |

OTHER PUBLICATIONS

Hegger, "Wastewater Treatment by Novel Hybrid Biological—Ion Exchange Process," University of Illinois, (2010).
Hong, et al, "Removal of Nitrogen by Immobilization Biological Activated Carbon (IBAC) Process," Study presented at the International Conference on Management and Service Science, 1-5 (2009).
Cui et al., "Experimental Study on Pretreatment of High Concentration Ammonia-Nitrogen Wastewater by TiO2 Photocatalysis," Presented at the 3rd International Bioinformatics and Biomedical Engineering Conference, (2009).
Li and Yang, "A Pilot Plant Study Using a Contact Oxidation Filtration Separation Integrated Bioreactor to Treat Municipal Wastewater," Study presented at the 4th International Conference on Bioinformatics and Biomedical Engineering, pp. 1-5 (2010).
Lin, et al. "Removal of ammonia nitrogen in wastewater by microwave radiation: a pilot-scale study", Journal of Hazardous Materials, 168(2-3):862-7 (2009).
Rui, "Ammonium Nitrogen Wastewater Treatment by Aerobic Granular Sludge Membrane Bioreactor," Study presented at the 2rd International Conference on Bioinformatics and Biomedical, Engineering, pp. 3469-3471 (2008).
Shahmoradi, et al, "Photocatalytic treatment of municipal wastewater using modified neodymium doped TiO2 hybrid nanoparticles," Journal of Environmental Science & Health, 45(10):1248-55 (2010).
Wang, et al, "Study on the Removal of NH3-N from the Ammonia Water in AS Process Using Fine Chemicals," Study presented at the 3rd International Conference on Bioinformatics and Biomedical, Engineering, Iss 1006-6780 (1998).
Xiao, et al, "Electrochemical process combined with UV light irradiation for synergistic degradation of ammonia in chloride-containing solutions," Water Research, 43(5):1432-40 (2009).
Chen et al., "Equilibrium and Kinetics of Ammonia Nitrogen Biosorption from Wastewater by Spent Grains," Study presented at the 3rd International Conference on Bioinformatics and Biomedical Engineering, (2009).

\* cited by examiner

*Primary Examiner* — Timothy Vanoy
(74) *Attorney, Agent, or Firm* — Pabst Patent Group LLP (57) ABSTRACT

A process has been developed to selectively dissociate target molecules into component products compositionally distinct from the target molecule, wherein the bonds of the target molecule do not reform because the components are no longer reactive with each other. Dissociation is affected by treating the target molecule with light at a frequency and intensity, alone or in combination with a catalyst in an amount effective to selectively break bonds within the target molecule. Dissociation does not result in re-association into the target molecule by the reverse process, and does not produce component products which have a change in oxidation number or state incorporated oxygen or other additives because the process does not proceed via a typical reduction-oxidation mechanism. Target molecules include ammonia for waste reclamation and treatment, PCB remediation, and targeted drug delivery.

29 Claims, 1 Drawing Sheet

PROCESSES AND USES OF DISSOCIATING MOLECULES

CROSS REFERENCE TO RELATED APPLICATIONS

This application claims the benefit of and priority to U.S. Provisional Application Ser. No. 61/236,592 filed Aug. 25, 2009, U.S. Provisional Application Ser. No. 61/306,281 filed Feb. 19, 2010, and U.S. Provisional Application Ser. No. 61/315,262 filed Mar. 18, 2010, all of which are incorporated herein by reference in their entirety.

FIELD OF THE INVENTION

The present invention relates to a process for dissociating target molecules into ions or elements. The process can be used for energy, reclamation, and a variety of other applications, including drug delivery, by using selected individual or group bond energies of dissociation or ionization.

BACKGROUND OF THE INVENTION

The world energy landscape is vast and convoluted. A rapidly growing global population has resulted in an increased need for power production and distribution. Emerging nations, currently undergoing aggressive efforts in industrialization, have decreased energy supply and increased energy prices worldwide. Reliance on the non-renewable energy source fossil fuels such as oil, natural gas, and coal, has led to dangerous levels of greenhouse gas emissions and other air pollutants. In addition, the processes used for obtaining fossil fuels from the environment, such as drilling and strip-mining, can cause significant damage to the surrounding ecosystems.

The development of renewable energy technology is necessary to prevent further fiscal and environmental damage in the face of growing global energy needs. Simple, cost effective, and broad-scope energy alternatives to fossil fuels will give current energy providers efficient alternatives while providing emerging nations safe and cost effective options for future energy infrastructure plans.

Elimination of pathogen, herbicide, pesticide, and other unwanted material has become an enormous problem in soil, air, water (marine and fresh), and municipal systems. An example is polychlorinated biphenyls (PCBs), which were introduced into the environment through disposal of PCB-containing manufacturing products. Uncontrolled PCB dumping until 1977 led to dangerous levels of PCB compounds in water systems, ultimately resulting in plant, animal, and human toxicity.

Current methods for removing contaminants from waste sites include incineration, ultrasonic treatment of aqueous solutions, irradiation, pyrolysis, microbial digestion, and chemical treatment. However, all of these methods have significant drawbacks. Incineration is effective but expensive on a tonnage scale. Incomplete destruction of contaminants can give rise to secondary contaminants, requiring further treatment. Incineration also has the limitation of being useful to treat contaminated liquid and equipment, but not contaminated soil. Ultrasound remediation techniques can treat liquid-based waste, but form intermediates which require further remediation. Irradiation of deoxygenated PCBs with gamma radiation dechlorinates compounds to give inorganic chloride, biphenyl, and a number of indiscriminate and unknown intermediate contaminants. Pyrolytic methods are extremely energy consuming and also yield products which require post-pyrolytic treatment. Microbial decomposition is a form of bioremediation which is highly specific for contaminants, but is slow, and successful bioremediation treatment can require weeks or months.

Remediation methods for liquid samples include filtration, sedimentation, reverse osmosis, forward osmosis, oxidation/reduction processes, electrolysis, thermal radiation, irradiation, pyrolysis, and enzymatic degradation. Drawbacks to the above-mentioned processes are similar to those for traditional solid waste treatment; namely cost effectiveness, high energy consumption, and significant intermediate and by-product formation requiring further remediation.

Photocatalytic oxidation uses a photocatalyst for the destruction of substances in fluids or air. Useful photocatalysts are generally semiconductors with a room temperature band gap energy of about 3.2 eV. When this material is irradiated with photons (hv) having wavelengths less than about 385 nm (UV), the band gap energy is exceeded and electrons (e) are generated through promotion from the valence band to the conduction band which results in the generation of holes ($h^+$). The resulting highly reactive electron-hole pairs have lifetimes in the space-charge region of the photocatalyst that enables participation in chemical reactions, provided recombination events do not occur first. When a Titanium catalyst is used, the mechanism is postulated to follow as below:

$$TiO_2 + h\nu \rightarrow h^+ + e^- \quad [1]$$

$$H^+ OH^- \rightarrow .OH \quad [2]$$

$$Ti^{4+} + e^- - Ti^{3+} \quad [3]$$

$$Ti^{3+} + O_{2ads} \rightarrow Ti^{4+} + O_{2ads}^- \quad [4]$$

$$.OH + pollutant \rightarrow oxidized\ pollutant \quad [5]$$

$$\text{Undesired Recombination Reaction: } h^+ e^- \rightarrow h\nu \text{ or heat} \quad [6]$$

Hydroxyl radicals (.OH) and super-oxide ions ($O_{2ads}^-$) are highly reactive species that can readily oxidize volatile organic compounds and aerosols adsorbed on catalyst surfaces. The Titanium-catalyzed process uses additives such as adsorbed oxygen on the surface of the catalyst. This mechanism and process result in the formation of oxygenated degradation by-products.

There is a need for a simple, cost effective process of harnessing the energy in waste material without the generation of intermediates or by-products which require further remediation. The end goal is a process for conversion of waste and other polluted material to useful components or inert substances which can be utilized for energy or other commercial purposes.

It is therefore the object of the present process to provide a process which eliminates oxygenated by-products generated by current remediation processes.

It is further an object of the present process to efficiently and rapidly dissociate waste products without generating intermediates which require further remediation.

It is another object of the present invention to use the products of the process to generate energy.

SUMMARY OF THE INVENTION

A process has been developed to selectively dissociate target molecules into component products compositionally distinct from the target molecule, wherein the bonds of the target molecule do not reform because the components are no longer reactive with each other. Dissociation is effected by treating the target molecule with energy such as light at a frequency and intensity, alone or in combination with a catalyst, in an amount effective to selectively break bonds within the target molecule. This process does not result in the re-association of the component parts into the target molecule by the reverse process. The process also does not produce component products by oxidation or reduction process, an exchange of electrons, or a change in oxidative state of the molecule which have incorporated oxygen or other additives because the process does not proceed via a typical reduction-oxidation mechanism.

In a preferred embodiment, the process is specific for target molecules, providing a mechanism for targeting molecules in a complex mixture. In another embodiment, the process can further include purification of the resultant component products. The process can be used to remediate waste or recycle the component products. In particular, the process can be used to dissociate target molecules to generate hydrogen, which can be used as an energy source. Examples include ammonia, as in urine, fertilizer runoff, and aguaculture wastes. In another embodiment, PCBs are degraded quickly, efficiently, and cost-effectively, producing biphenyl and elemental chlorine as the only byproducts of the reaction. Biphenyl is much less toxic and is more degradable than are the parent PCBs. The process can also be used to treat, prevent, and detect biological diseases and disorders. In a preferred embodiment, a nanoparticle composition includes a chemotherapeutic bioactive agent which is released by exposure to the selective energy frequency and intensity-energy of dissociation. In another embodiment, cells or microorganisms are selectively killed using the process.

DETAILED DESCRIPTION OF THE INVENTION

I. Definitions and Mechanisms

An atom is ionized by absorbing a photon of energy equal to or higher than the ionization energy of the atom. Multiple photons below the ionization threshold of an atom may combine their energies to ionize an atom by a process known as multi-photon ionization. These concepts also apply to molecules. Resonance enhanced multi-photon ionization (REMPI) is a technique in which a molecule is subject to a single resonant or multi-photon frequency such that an electronically excited intermediate state is reached. A second photon or multi-photon then ejects the electronically excited electron and ionizes the molecule.

Among a mixture of molecules with different bond dissociation energies, selective activation of one chemical bond requires a mono-chromatic source. For example, in a compound containing N—H (bond dissociation energy of 3.9 eV) and C—H (bond dissociation energy of 4.3 eV) bonds, a specific photon source of 4.0 eV dissociates the N—H bond exclusively.

The process described herein relies on two main principles. The first principle is that the dissociation of target molecules requires breaking multiple bonds. Thus, a plurality of photons or other energetic sources are absorbed by a given molecule. The second principle is that dissociation of molecules in a complex mixture can be achieved with specific selection of the energy for dissociation (both frequency and intensity), defined herein as the promoter.

"Irradiation" as generally used herein refers to subjecting or treating a sample with beams of particles or energy. Irradiation includes any form of electromagnetic or acoustic radiation.

"Bioactive agent" as generally used herein refers to any physiologically or pharmacologically active substances that act locally or systemically in the body. A biologically active agent is a substance used for the treatment (e.g., therapeutic agent), prevention (e.g., prophylactic agent), diagnosis (e.g., diagnostic agent), cure or mitigation of one or more symptoms of a disease or disorder, a substance which affects the structure or function of the body, or pro-drugs, which become biologically active or more active after they have been placed in a predetermined physiological environment. Examples can include, but are not limited to, small-molecule drugs, peptides, proteins such as antibodies, sugars, polysaccharides, nucleotides, oligonucleotides such as aptamers, siRNA, and miRNAs, and combinations thereof.

"Bond dissociation energy" as generally used herein refers to the standard enthalpy of change when a bond is cleaved.

"Bond energy" as generally used herein refers to the average of the sum of the bond dissociation energies in a molecule.

"Component products" as generally used herein refers to known ions or atoms composed of only elements found within the target molecule. Individual component products have a chemical formula distinct from the target molecule. An example is $N_2$ and $H_2$, which are each component products of $NH_3$.

"Catalyst" as generally used herein refers to any chemical which enhances the rate and/or efficiency of molecular dissociation compared with the rate and/or efficiency of dissociation in the absence of the catalyst.

"Chemical waste" as generally used herein refers to any inorganic or organic substance, present in any physical state, that is unwanted in a given sample due to environmental or toxicity concerns.

"Dissociation" as generally used herein refers to breaking the bonds of a molecule. Dissociation in the current process is requires that the original bonds of the target molecule do not re-associate.

"Excited state" as generally used herein refers to a state in which one or more electrons of an atom or molecule are in a higher-energy level than ground state.

"Globally" as generally used herein refers to treatment of an organism with a energy of dissociation over a surface area including multiple organs. In the extreme instance, globally refers to treatment of the entire organism with a energy of dissociation without regard to the specific tissue or target organ of interest.

"Locally" as generally used herein refers to injection of a nanoparticle composition in a target tissue or organ of interest.

"Nanoparticle", as generally used herein refers to particle or a structure in the nanometer (nm) range, typically from about 0.1 nm to about 1000 nm in diameter.

"Non-target molecule" as generally used herein refers to the any substance within a sample containing target molecules which is not affected by the process.

"Pharmaceutically acceptable" as generally used herein refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

"Promoter" as generally used herein refers to the energy required for dissociation of a target bond, which is both selective for the target bond and sufficient to prevent re-association of the bond.

"Energy of dissociation source" as generally used herein refers to any chemical, apparatus, or combination thereof, which supplies the energy of dissociation with the energy required to dissociate target bonds within a target molecule. The energy of dissociation source must supply suitable intensity and suitable frequency for target bond dissociation. An example of a energy of dissociation source is a xenon lamp coupled to a pulse generator. A energy of dissociation source can optionally contain a catalyst. An example of such an energy of dissociation source is a titanium dioxide catalyst and a xenon lamp coupled to a pulse generator.

"Recycling" as generally used herein refers to reusing substances found in waste for any purpose.

"Remediation" as generally used herein refers to treatment of waste to capture stored energy or useful components trapped therein "Sample" as generally used herein refers to at least one target molecule which is subjected to the dissociation process. A sample can comprise both target and non-target molecules.

"Systemically" as generally used herein refers to compositions which are administered to a subject by means other than injection into a target tissue or organ.

"Targeting agent" as generally used herein refers to any entity which is specific for a particular cell type, tissue, or organ within an organism. Targeting agents can be synthetic or biologic agents. Biologic, synthetic, and other targeting agents on the surface of the nanoparticle compositions direct the nanoparticle composition to cells of interest which are to be treated with the encapsulated bioactive agent upon treatment with the promoter.

"Target bond" as generally used herein refers to any bond within a target molecule. Target bonds can be covalent, ionic, or "weak bonds" including dipole-dipole interactions, London dispersion forces, or hydrogen bonding. Target bonds can be single or multiple covalent bonds.

"Target molecule" as generally used herein refers to a molecule, or portion of a macromolecule, that contains at least one bond. A target molecule can be a nanoparticle.

II. Target Compositions

A. Target Molecules

Target molecules must contain at least one bond to be dissociated. Target molecules can be any compound of the solid, liquid, gas, or plasma physical state. Target molecules can be charged or uncharged. Target molecules can be naturally occurring or synthetically prepared compounds.

In one embodiment, target molecules are purified material. An example is distilled water, which is dissociated into $H_2$ and $O_2$ by the process described herein. In another embodiment, target molecules are in a mixture including non-target molecules. An example of such an embodiment is ammonia dissolved in water. In this embodiment, ammonia is the target molecule, and is dissociated into $N_2$ and $H_2$. Water in this embodiment is not dissociated because the energy of dissociation is specific for the energy required to dissociate the N—H bonds of ammonia and not the O—H bonds of water.

The process can be used to dissociate almost any molecule. For remediation, this may be a molecule such as PCB. Target molecules are preferably waste or pollutant products from any source, such as alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, methane, nitrogenous wastes (sewage, waste water, and agricultural runoff), nitric acid, nitrogen dioxide, ozone, pesticides, polychlorinated biphenyls, oil, ozone, sulfur dioxide, and sulfuric acid. Target molecules can be reactive or volatile aliphatic or aromatic organic compounds.

In the medical field, the molecule may be a nanoparticle releasing a therapeutic, prophylactic or diagnostic agent. Target molecules can also be critical proteins, polysaccharides, or oligonucleotides of infectious agents, transformed (cancerous) cells, bacteria, or other living organisms. Delivery of therapeutic, prophylactic or diagnostic agents can be effected by exposure to the energy of dissociation in a highly specific and controlled manner. This may be application to the molecules per se, or to nanoparticles formed of or incorporating agent to be released.

B. Target Bond

A target bond is any bond within a target molecule. Types of bonds affected by the dissociative process described herein include covalent, ionic, van der Waals, hydrogen bonding, or London dispersion forces or any bond which can form and has dissociation energy or energies if applied will break the bond and not allow the reformation of the bond. In the embodiment where the target bond is covalent, the bond can be a single bond, double bond, or triple bond. The energy of dissociation must be specific for the target bond of the target molecule. A non-limiting list of exemplary target bonds include N—H, C—H, C—C, C=C, C≡C, C—N, C=N, C≡N, C—O, C=O, C≡O, O—H, O—P, O=P, and C—X bonds, where X is any halogen selected from chlorine, fluorine, iodine, and bromine.

The energy of dissociation energy of dissociation is specific for the bond dissociation energy of a target bond. Bond dissociation energies are well known in the art. Examples of bond dissociation energies include H—H, 104.2 kcal/mol; B—F, 150 kcal/mol; 146 kcal/mol; C—C, 83 kcal/mol; B—O, 125 kcal/mol; N≡N, 109 kcal/mol; N—N, 38.4 kcal/mol; C—N, 73 kcal/mol; O=O, 119 kcal/mol; O—O, 35 kcal/mol; N—CO, 86 kcal/mol; C=N, 147 kcal/mol; F—F, 36.6 kcal/mol; C—O, 85.5 kcal/mol; C=O (CO2), 192 kcal/mol; Si—Si, 52 kcal/mol; O—CO, 110 kcal/mol; C=O (aldehyde), 177 kcal/mol; P—P, 50 kcal/mol; C—S, 65 kcal/mol; C=O (ketone), 178 kcal/mol; S—S, 54 kcal/mol; C—F, 116 kcal/mol; C=O (ester), 179 kcal/mol; Cl—Cl, 58 kcal/mol; C—C, 181 kcal/mol; C=O (amide), 179 kcal/mol; Br—Br, 46 kcal/mol; C—Br, 68 kcal/mol C=O (halide), 177 kcal/mol; I—I, 36 kcal/mol; C—I, 51 kcal/mol; C=S (CS2), 138 kcal/mol; H—C, 99 kcal/mol; C—B, 90 kcal/mol; N=O (HONO), 143 kcal/mol; H—N, 93 kcal/mol; C—Si, 76 kcal/mol; P=O ($POCl_3$), 110 kcal/mol; H—O, 111 kcal/mol; C—P, 70 kcal/mol; P=S ($PSCl_3$), 70 kcal/mol; H—F, 135 kcal/mol; N—O, 55 kcal/mol; S=O ($SO_2$), 128 kcal/mol, H—Cl, 103 kcal/mol; S—O, 87 kcal/mol; S=O (DMSO), 93 kcal/mol; H—Br, 87.5 kcal/mol; Si—F, 135 kcal/mol; P=P, 84 kcal/mol; H—I, 71 kcal/mol; Si—Cl, 90 kcal/mol; P≡P, 117 kcal/mol; H—B, 90 kcal/mol; Si—O, 110 kcal/mol; C≡O, 258 kcal/mol; H—S, 81 kcal/mol; P—Cl, 79 kcal/mol; 200 kcal/mol; H—Si, 75 kcal/mol; P—Br, 65 kcal/mol; N≡N, 226 kcal/mol; H—P, 77 kcal/mol; P—O, 90 kcal/mol; C≡N, 213 kcal/mol.

In one embodiment, target bonds are dissociated heterolytically by the process described herein. When heterolytic cleavage occurs, ionic component products may be produced in addition to radicals and ejected electrons, for example:

The radicals can re-associate to form A:B, but in the preferred embodiment, the radicals re-associate in a homomeric fashion to form A:A and B:B component products. One, two, or more identical radicals can associate to form known ions, atoms, or molecules.

In some embodiments, target molecules contain multiple non-identical atoms, multiple oxidation states, or combinations thereof, all of which contain a variety of types of target bonds. Examples of target molecules with non-identical target bonds containing multiple non-identical atoms are dichloroethane ($CH_2Cl_2$) and ethanolamine ($OHCH_2CH_2NH_2$). Examples of target molecules with non-identical target bonds with multiple oxidation states include ethyl acetylene $HC{\equiv}CH_2CH_3$ and ethyl isocyanate ($CH_3CH_2N{=}C{=}O$).

C. Sample Preparation

The sample can be in any physical state including solid, liquid, gas, plasma, or combination thereof for treatment. In one embodiment, gaseous material is dissolved in water. Gaseous waste sources include, among others, ventilation makeup air, ambient air, air from stripping and off-gassing operations, soil vapor extraction (SVE), airborne matter, organic particulate matter, process vent gas, and wastewater treatment off-gas.

In one embodiment aqueous treatment streams including liquid effluents, wastewater, industrial runoff, and agricultural runoff is used as the sample. These liquid waste sources are already in aqueous form and can be directly treated with the promoter. In one embodiment, solid and sludge waste sources such as landfill waste and polluted soil are treated.

In some embodiments, the target molecule is present in a range from 1 part per billion (ppb) or lower to very high concentrations.

In another embodiment, the sample is completely comprised of target material. An example of such an embodiment is water.

Those skilled in the art will recognize the energy of dissociation intensity and duration of energy of dissociation treatment will need to be adjusted based on concentration of target molecules in a sample. Higher concentrations of target molecules are successfully dissociated by increasing energy of dissociation power (wattage), increasing exposure time to the promoter, or a combination thereof.

III. Energy of Dissociation and Energy Sources

The energy of dissociation is the energy required for dissociation of a target molecule, and is specific for the target bond or bonds within a target molecule. The energy of dissociation is tunable and specific for the bond dissociation energy of any target bond within any target molecule.

The energy of dissociation is applied at a frequency and intensity effective for both scission of the target bond and target molecule dissociation.

In an example, the target molecule is AB, and application of the energy of dissociation specific for the A-B bond results in ejection of an electron from the target bond yielding a radical, an ion, and an electron, according to the following possible mechanisms:

The ions and radicals can be stable isolable species, or can combine with other ions to form molecules, i.e. the component products. The ejected electrons can be captured by an electron sink. The intensity of the energy of dissociation must be such that re-association of components back into the target molecules does not occur.

In one embodiment, application of the energy of dissociation satisfies the bond dissociation energy of the target bond of a target molecule via a one step electronic process, and the target bond is dissociated. Once one target bond has been dissociated, the energy of dissociation source can be tuned to the frequency of a second target bond dissociation energy and applied to the sample to affect dissociation of a second target bond. The energy of dissociation sources can be tuned as needed to dissociate all target bonds of the target molecule. There are numerous apparatuses that can provide multi-energy or photons within a nano second or quicker to effect irreversible dissociation and prevent formation of reactants from the dissociated target molecule components.

In another embodiment, application of the energy of dissociation satisfies the bond dissociation energy of the target bond of a target molecule via a process involving the Rydberg excited state of the target molecule. First, the energy of dissociation source excites the target molecule to a Rydberg state, wherein the energy required to nearly remove an electron from the ionic core (the ionization or dissociation energy) of a target molecule has been achieved. Next, the same or different energy of dissociation source then supplies sufficient energy to eject the excited electron from the target bond. In this embodiment, one or more energy of dissociation sources can be used for each step. Once one target bond has been dissociated, the energy of dissociation source can be tuned to the frequency of a second target bond dissociation energy. The energy of dissociation sources can be tuned as needed to dissociate all target bonds of the target molecule.

For example, treatment of ammonia with an energy of dissociation occurs via the two-step process involving the Rydberg State. First, energy of dissociation treatment of 193 nm excites a shared electron in the N—H bond such that ammonia is in an excited Rydberg state. Subsequent energy of dissociation treatment of 214 nm energy expels the electron and dissociates ammonia into $NH_2^-$ and H. Subsequent dissociative processes will give component products which re-associate to form $N_2$ and $H_2$.

In one embodiment, the one-step process, the two-step process, or a combination thereof are used to dissociate the target molecule. In one embodiment, one or more energy of dissociation sources are used for dissociation of each target bond within a target molecule. In one embodiment, one or more energy of dissociation sources are used in combination for dissociation of each target bond within a target molecule.

An exemplary molecule contains N—H, C—O, and O—H bonds. The N—H bond is cleaved with application of a 193 nm and 214 nm xenon bulb energy of dissociation source. The C—O bonds are cleaved with a mono-chromatic pulse generator. The O—H bonds are cleaved with a combination of photocatalyst and UV radiation. All of these energy of dissociation sources comprise the energy of dissociation required for complete dissociation of all the bonds of the target molecule. In some cases this requires three or more bond energies to expel the electron. In some cases, a filter may be used to isolate wavelengths or energies from a wide range source.

A. Energy of Dissociation Sources

An energy of dissociation source provides the energy of the promoter. The energy of dissociation source delivers irradiative energy, catalysis, or combinations thereof. An energy of dissociation source supplies the energy of dissociation with electromagnetic energy, acoustic energy, or any other energy which meets the bond dissociation energy of the target bond. The energy of dissociation source energy is selected from a non-exclusive list including photonic, photo-catalytic, chemical, kinetic, potential, magnetic, thermal, gravitational, sound, light, elastic, DC or AC modulation current (electrical), plasma, ultrasound, piezoelectric, or electrochemical energy.

Energy of dissociation sources include any apparatus which can supply the specific bond dissociation energy to break target bonds of target molecules specifically without non-target molecule bonds being affected. Examples include mono-chromatic light, monotone sound, or any other mono-energy source.

In one embodiment, an energy of dissociation source is applied at the appropriate frequency and intensity to attain a multi-photon or multi-frequency energy of dissociation within a rapid time scale through use of a generator of nano to pico-pulse cycles.

In some embodiments, energy of dissociation sources can be frequency generators, electrical generators, plasma generators, arc lamps, pulse generators, amplifying generators, tunable lasers, ultraviolet lamps, ultraviolet lasers, pulse ultraviolet generators, and ultrasound generators.

In some embodiments, the energy of dissociation source is one or more reactor beds having any number of lamps, generators, and/or bulbs; lamps, generators, and/or bulbs having the same or different sizes in terms of diameter and length; lamps, generators, and/or bulbs having the same or different wattages and/or any combination of the foregoing. The lamps, generators, and/or bulbs useful in this method can be any shape, size, or wattage. For example, use of a pulse light source allows one to use a 10 watt input of energy and generate 400,000 watts of pulse energy within ⅓ of a second of output, thereby reducing energy usage and equipment size and cost.

In preferred embodiments, the energy of dissociation source is a pulse tunable laser or diode attached to a pulse generator.

Those skilled in the art will recognize the nature of the target bond and target molecule will determine the identity, frequency, and intensity of energy of dissociation source.

In one embodiment, photocatalytic processes use ultraviolet light promoters, supplied by ultraviolet energy of dissociation sources that are positioned to emit photons of ultraviolet light. The ultraviolet light sources are generally adapted to produce light having one or more wavelengths within the ultraviolet portion of the electromagnetic spectrum. However, the method should be understood as including ultraviolet light sources that may produce other light having one or more wavelengths that are not within the ultraviolet portion (e.g., wavelengths greater than 400 nm) of the electromagnetic spectrum.

In other photocatalytic processes, the energy of dissociation source is replaced by other devices, such as lamps or bulbs other than ultraviolet fluorescent lamps or bulbs; non-ultraviolet light emitting diodes; waveguides that increase surface areas and direct ultraviolet light and any energy light source that activates a photocatalyst; mercury vapor lamps; xenon lamps; halogen lamps; combination gas lamps; and microwave sources to provide sufficient energy to the photocatalyst substance to cause the bond dissociation to occur.

In one embodiment, the photocatalyst is applied to the surface of a fiber optic device and activated from the inside by the specific energy of dissociation. The fiber optic device can be placed into a membrane through which air, solids or liquids flows.

B. Energy of Dissociation Source Intensity

Energy of dissociation source intensity is the quantity of energy supplied to the promoter, which treats a target molecule. Energy of dissociation source intensity is directly proportional to the number and percentage of bonds which can be dissociated. Low intensity energy of dissociation sources have the capability to dissociate a smaller proportion of target bonds compared to a higher intensity energy of dissociation sources. For example, in a photonic energy of dissociation source, the greater the number of photons present, the higher the likelihood of ejecting electrons.

In one embodiment, energy of dissociation source intensity is increased by use of a pulse generator in conjunction with a lamp of the proper wavelength, or a tunable laser. In a preferred embodiment, the pulse generator supplies a predetermined number of pulses per second.

C. Energy of Dissociation Source Frequency

The frequency of energy of the energy of dissociation source (in photonic cases, the wavelengths of radiant energy) specifically dissociates target bonds of target compounds. One frequency, multiple selected frequencies, or combinations of energy of dissociation source frequencies can be used depending on the chemical structure of the target material. The apparatus must deliver sufficient intensity of the dissociation energy to completely dissociate the bond in adequate numbers to satisfy the need of the end user.

Methods of determining the appropriate frequency at which a target bond can be dissociated is known in the art, and include resonance enhanced multi-photon ionization (REMPI) spectroscopy, resonance ionization spectroscopy (RIS), photofragment imaging, product imaging, velocity map imaging, three-dimensional ion imaging, centroiding, zero electron kinetic imaging (ZEKE), mass enhanced threshold ionization (MATT), and photo-induced Rydberg ionization (PIRI).

Wavelengths to dissociate hydrogens from ammonia are 193, 214, 222, 234 and 271 nm. Three or more of these wavelengths in combination break $NH_3$ into its components: $N_2$ (g) and $H_2$ (g) without producing ozone. Examples of wavelengths for dissociation include 193 nm and 214 nm, both of which are required. A wavelength of 248 nm will break down Ozone. In a preferred embodiment, the energy of dissociation source frequency range is from 115 nm to 400 nm, with appropriate filters, to satisfy the precise frequency of dissociation energies required for hydrogen dissociation only. Adjustments are made for cage effect and molecular interaction.

In one embodiment, the energy of dissociation source frequency is supplied by a tunable laser or light energy source that subjects samples to a mono-energy.

If the proper dissociation bond energy at a sufficient intensity to dissociate a selected bond or group of bonds is applied, there are no indiscriminate or random molecules or atoms produced other than what will be determined by the selected bonds which are targeted for dissociation, eliminating the random production of undesirable by-products or intermediates seen in oxidation and reduction, microbial or indiscriminate chemical reaction. An electron sink can also be added to the process to insure that there is no recombination or potential for intermediate or by-product production.

D. Catalysts

In one embodiment, the energy of dissociation source includes a catalyst. The catalyst enhances the rate of bond dissociation. The catalyst can be any material of any physical configuration which is compatible with the sample and any other energy of dissociation sources. Catalysts may be uni-functional, multifunctional, or a combination thereof. Catalysts can be used alone or in combination with other catalysts. The catalyst is used to drive the reaction to 100% completion, i.e., dissociating generally every ammonia molecule into nitrogen and hydrogen. The catalyst is applied to the target molecule or an interface between the energy source and the target molecule wherein the target molecule contacts the catalyst. Catalyst is applied to a surface (such as a nanoparticle or tube), or dispersed into a liquid or suspension, through which the energy passes to the target molecules.

In a preferred embodiment, an energy of dissociation source includes a photocatalyst and photonic (light-based) energy source. The photocatalyst provides an effective means for converting light into chemical energy. The catalyst or photocatalyst is semi-conductive material such as titanium oxides, platinized titania, amorphous manganese oxide, and copper-doped manganese oxide, titanium dioxide, strontium titanate, barium titanate, sodium titanate, cadmium sulfide, zirconium dioxide, and iron oxide. Photocatalysts can also be semiconductors that support a metal, such as platinum, palladium, rhodium, and ruthenium, strontium titanate, amorphous silicon, hydrogenated amorphous silicon, nitrogenated amorphous silicon, polycrystalline silicon, and germanium, and combinations thereof. Catalysts or photocatalysts can be carbon-based graphene or graphite, as well as carbon-doped semi-conductive or other magnetic material, for example, graphene doped AMO.

The data in Example 1 show good activity of Cu-AMO in the photocatalytic degradation of $NH_3$. Some of the parameters to increase activity include enhanced surface area, optimization of $[Cu^{2+}]$, and resultant morphology. The electronic properties of the catalyst may also be important since the AMO is mixed valence ($Mn^{2+}$, $Mn^{3+}$, $Mn^{4+}$) and possible reduction of $Cu^{2+}$ to $Cu^{1+}$. The most active photocatalysts can be analyzed with X-ray photoelectron spectroscopy to study the oxidation state of the copper in these materials. Catalysts are characterized with X-ray powder diffraction (XRD) to study any crystallinity of the materials, electron diffraction (ED) in a transmission electron microscope (TEM) to study both crystalline and amorphous content of the catalyst, and atomic absorption (AA) for compositions of the catalyst. Semi-quantitative analyses of the solid sample can be done by energy dispersive X-ray analyses in a scanning electron microscope (SEM).

E. Duration of the Process

The process typically is conducted until all target molecules have been dissociated into component products. Examples of duration of time include from a fraction of a second to 10 minutes. In a preferred embodiment, the process is conducted for one minute.

Those skilled in the art will recognize the energy of dissociation source intensity, concentration of sample, and energy of dissociation source energy required will effect the amount of time required for complete dissociation.

IV. Methods of Use

A specific frequency of light at the proper intensity when applied to molecules, optionally in the presence of a catalytic or similar promoter, will dissociate any selected bond, resulting in the destruction or inactivation through atomic dissociation of the molecule. The component product gases, elements or chemicals can be purified, stored, utilized or disposed of.

A. Remediation

In some embodiments, chemical waste or polluted material comprising target molecules are subjected to dissociation with an energy of dissociation to remediate treatment streams or waste sources. Types of treatment streams include, among others, ventilation makeup air, ambient air, air from stripping and off-gassing operations, soil vapor extraction (SVE), airborne matter, organic particulate matter, process vent gas, wastewater treatment off-gas, liquid effluents (e.g. wastewater, aquaculture water, industrial and agricultural runoff) containing at least one undesirable or otherwise unwanted compound. In other embodiment, the process can also be used to remediate solid waste, sludge waste, landfill waste, and polluted soil.

Nitrate and Ammonia Remediation in Water and Agriculture

For example, ammonia gas, generally found dissolved in effluent streams and waste products resulting from farming and agriculture or aquaculture, can be dissociated into $N_2$ and $H_2$ gases. Nitrate, one of the oxidation results of ammonia when found in ground water at levels of 10 ppm or more has been proven to cause spontaneous abortions in pregnant woman. With the increase in agriculture runoff and seepage into our fresh and salt water systems a need to remove these nitrogenous byproducts and most all others has become a necessary requirement to protect our growing population.

Every 7 to 10 years, local municipal sewer and water systems need to re-tool due to wear of the equipment and to expand due to increasing population. This approach of removing microorganism and other introduced contaminants would replace several of the current energy wasteful and excessively over sized processes into a compact unit whose cost should be much less then the combined current removal units. The energy consumption per contaminant destroyed will be considerably less than current practices. The foot print is quite a bit smaller than current commercial units. Therefore, this technology can provide a competitive advantage for the distributor when these systems are placed in center city areas or in the home where space is at a premium. This technology also provides an effective level of contaminate elimination which has been unavailable in the past. The microorganism or target molecule kill rate will be absolute with no toxic by-products produced, preventing such disasters as algae blooms or disease micro-organism contamination due to unchecked discharges of many of these nutrient rich and disease laden by-products which are not removed from most of the current municipal facilities.

Other related markets include photocatalytic systems for cleanup of nitrogen wastes in aquariums, consumer fish tanks or aquaculture applications, as well as cleanup of contaminates found in confined sites for example, in submarines, on ships or in government facilities in isolated areas where water is scarce or contaminated. Other applications include portable devices for treatment of water for consumption in the environment. The competitors in the aquarium market use bio-filtration techniques which are ineffective and produce many harmful by-products. Other applications which have been used or are being worked on for this market are low intensity UV system or oxidation systems which all produce harmful by-products due to their incomplete processing of contaminates or the production or use of secondary products such as Ozone which are also harmful to the inhabitants of the tank system and the owners of those tanks.

PCB Remediation

A major application of this technology is in PCB remediation. Polychlorinated biphenyls are mixtures of up to 209 individual chlorinated compounds known as congeners. There are no known natural sources of PCBs. PCBs have been introduced into our environment due to their use as coolants and lubricants in transformers, capacitors, and other electrical equipment. Although the production of PCBs was stopped in 1977 they continue to effect our environment and all living organisms. The literature is full of accounts of the harmful effects of PCBs on animal and plant life. For example in 1968 in Japan 14,000 people where poisoned by eating chicken whose rice feed was contaminated by PCB. It was also noted in a 2008 New York Times report "Toxic Breast Milk" that PCBs found their way into healthy nursing mothers throughout the US to levels topping the 1000 s of ppb of PCB level.

PCBs were dumped uncontrollably into the environment for years before the harmful effects of this chemical were known. GE dumped over 1.3 million pounds of PCBs into the Hudson River between 1947 to 1977. Other areas of major contamination are the areas around the old Westinghouse plant in Bloomington, Ind. The great lakes are still heavily polluted, despite extensive work to clean up the area.

Global transportation through atmospheric pollution has become a major problem in protecting the US populate from exposure from other countries and from any atmospheric transport from our own sites. It has been estimated that due to the atmospheric concentration of PCBs in Milwaukee of 1.9 ng/m$^3$, Lake Michigan accumulates 120 Kg/year of PCBs. Some homes in the US have recorded concentrations as high as 35 ng/m$^3$, 10 times higher than EPA guideline limits of 3.4 ng/m$^3$.

PCBs exhibit a wide range of toxic effects. These effects may vary depending on the specific PCB. Similar to dioxin, toxicity of coplanar PCBs and mono-ortho-PCBs are thought to be primarily mediated via binding to aryl hydrocarbon receptor (AhR). Because AhR is a transcription factor, abnormal activation may disrupt cell function by altering the transcription of genes. The concept of toxic equivalency factors (TEF) is based on the ability of a PCB to activate AhR. For example, di-ortho-substituted non-coplanar PCBs interfere with intracellular signal transduction dependent on calcium; this may lead to neurotoxicity. Ortho-PCBs may disrupt thyroid hormone transport by binding to transthyretin.

Current methods of elimination of PCBs are physical, microbial, chemical and containment, all of which have their benefits and drawbacks. Large quantities of PCBs have been placed in landfills, mainly in the form of transformers and capacitors. Many municipal sites are not designed to contain these pollutants and PCBs are able to escape into the atmosphere or ground water.

Incineration can be quite effective yet is expensive, can transfer intermediate contaminates into the air or water and can form new contaminates such as PCDDs, PCDFs, dioxins, in addition to those formed by the incomplete destruction of the PCB, itself. Such specific conditions mean that it is extremely expensive to destroy PCBs on a tonnage scale, and it can only be used on PCB containing equipment and contaminated liquid. This method is not suitable for the decontamination of affected soils.

In a similar process to combustion, high power ultrasonic waves are applied to water, generating cavitation bubbles. This process converts the PCB to another form. This form can also be harmful and need further treatment. This process is also energy consuming.

If a deoxygenated mixture of PCBs in isopropanol or mineral oil is subject to irradiation with gamma rays then the PCBs will be dechlorinated to form inorganic chloride and biphenyl. This process is indiscriminate and many unknown intermediate contaminates can be formed. The process is also inhibited by such substances as oxygen, nitrous oxide, sulfur hexafluoride or nitrobenzene.

Destruction of PCBs with pyrolysis using plasma arc processes, like incineration uses heat, however unlike incineration, there is no combustion. The process can be energy consuming. The long chain molecules are broken with extreme temperature provided by an electric arc in an inert environment. Adequate post pyrolisis post treatment of the resultant products is required in order to prevent the risk of back reactions.

Many chemical methods are available to destroy or reduce the toxicity of PCBs. Generally these processes are linked to high temperatures, they form intermediates, are oxidizing and are subject to inhibition.

Work has centered on the study of micro-organisms that are able to decompose PCBs. Generally, these organisms work very slowly. They tend to be highly selective in their de-chlorination, although not so much when it comes to selecting a carbon source where they may be redirected by accessing other sources of carbon, which they decompose in preference to PCBs. They are also inhibited by environmental, chemical and competitive habitats, therefore they either are not able to perform the decomposition or the process proceeds at a much reduced rate. Further recent developments have focused on testing enzymes and vitamins extracted from microbes which show PCB activity. Especially promising seems to be the use of vitamin B12, in which a cobalt ion is in oxidation state (III) under normal redox conditions. Using titanium (III) citrate as a strong reductant converts the cobalt from Co(III) to Co(I), giving a new vitamin known as B12s, which is a powerful nucleophile and reducing catalyst. This can then be used on PCBs, which it de-chlorinates in a rapid and selective manner. Many inhibiting factors can affect the results. This process only eliminates the biological aspect of the process and takes a known catalyst in the form of an enzyme to perform a decomposition of PCB.

In contrast to these processes, a discriminate photocatalytic process selected only for PCB will not form toxic intermediate by-products with the process immune to inhibition by other chemicals. Moreover, the Cu doped AMO catalyst will perform better than the natural enzyme catalysts and produce a more economical, efficient and non-(by-product) producing solution over the current methods. The major pathway for atmospheric destruction of PCBs is via attack by OH radicals. However, this process is indiscriminate and will product varying by-products. Direct photolysis can occur in the upper atmosphere, but the ultraviolet wavelengths necessary to excite PCBs are shielded from the troposphere by the ozone layer. By selecting the precise bond energies for the destruction of PCBs, concentrating them and applying them with a selective energy of dissociation catalyst at sufficient intensity one should realize 100% destruction with no by-product creation.

B. Energy Recycling and/or Recovery

In one embodiment, component products, once purified, are used to generate energy according to the following process:

(a) treating a sample comprising a target molecules to dissociate the target molecule into component products;
(b) purifying the component products; and
(c) using at least one component product as a source of energy.

In one embodiment, the resultant component products of dissociation process are purified and/or utilized for another purpose. For example, resultant component products, such as gases, are collected by a microsieve or a nanosponge. In another embodiment, evolved hydrogen gas is dissolved in water and converted to gaseous hydrogen. The gaseous hydrogen can further be purified by scrubbing, cryogenic separation, pressure-swing adsorption, or membrane separators.

In one embodiment, hydrogen gas resulting from the process is used to power fuel cells. In a preferred embodiment, hydrogen gas, generated by dissociation of ammonia in urine with a promoter, is recovered and utilized as an energy source. In the example of irradiative dissociation of ammonia, the resultant hydrogen gas can be purified and used for energy.

This could be used in situations such as the large waste processing tanks associated with the "mega" pig farms or dairy farms.

In one embodiment, component products can be further recycled for purposes other than energy generation according to the following process:
 (a) treating a sample to dissociates the target molecule into component products;
 (b) purifying the component products; and
 (c) recycling at least one component product.

In the example of irradiative dissociation of ammonia, the resultant nitrogen gas can be stored and utilized as a preservative or industrial chemical. Other component products, including all allotrope configurations, can be generated by the process including oxygen, sulfur, and phosphorous. All of these compounds are useful for various industrial processes.

C. Medical Applications

Effective mechanisms for targeting cells, tissues, and organs for specific delivery of bioactive agents, particularly chemotherapeutics, are needed. There also remains a need for a process of delivering bioactive agents with precision without damaging surrounding tissues.

The method described herein can be used to delivery drugs, release drugs, or selectively kill cancerous or infectious agents. These may be by targeting specific molecule on or in a cell or organism, or a molecule in the form of, attached to, or incorporated into a nanoparticle.

In some embodiments, the nanoparticle composition includes a nanoparticle such as a biodegradable nanoparticle, buckyball, carbon nanotube, liposome, nanoshell, dendrimer, quantum dot, magnetic nanoparticle, superparamagnetic nanoparticle, nanorod, gold nanoparticle, semiconductor nanoparticle (quantum dot or boron doped silicon nanowire), silicon oxide particle, a viral particle, or a combination thereof. The target molecule can be a gold nanoparticle composition which has at least one dimension measuring less than a micron in length. In some embodiments, the gold nanoparticle compositions are in the form of nanorods, nanospheres and nanoplatelets.

In some embodiments the gold nanoparticle can be made of a gold alloy. Metals that can be used to form the gold alloy nanoparticle compositions preferably have a high Z number, and include, but are not limited to, gold, silver, platinum, palladium, cobalt, iron, copper, tin, tantalum, vanadium, molybdenum, tungsten, osmium, iridium, rhenium, hafnium, thallium, lead, bismuth, gadolinium, dysprosium, holmium, and uranium.

In another embodiment, the target molecule is a nanoparticle composition made of a metal core and a modified surface layer surrounding the metal core. The metal core is preferably gold. However, in some embodiments, the metal core may be made of a gold alloy or another metal. Metals which can be used to form the metal core of the alloy nanoparticle compositions preferably have a high Z number and include, but are not limited to, gold, silver, platinum, palladium, cobalt, iron, copper, tin, tantalum, vanadium, molybdenum, tungsten, osmium, iridium, rhenium, hafnium, thallium, lead, bismuth, gadolinium, dysprosium, holmium, and uranium. The metal core can consist of one metal, or it can be a mixture or an ordered, concentric layering of such metals, or a combination of mixtures and layers.

Bioactive Agents

In preferred embodiments, the nanoparticle compositions include one or more bioactive agents. Exemplary bioactive agents are selected from a non-exclusive list including anti-virals such as acyclovir and protease inhibitors alone or in combination with nucleosides for treatment of HIV or Hepatitis B or C, anti-parasites (helminths, protozoans), anti-cancer agents (chemotherapeutics), antibodies and bioactive fragments thereof (including humanized, single chain, and chimeric antibodies), peptide drugs, anti-inflammatories, oligonucleotide drugs (including antisense, aptamers, ribozymes, external guide sequences for ribonuclease P, and triplex forming agents), antibiotics, genes, antiulcerative agents such as bismuth subsalicylate, digestive supplements and cofactors, and vitamins.

In some embodiments, bioactive agents are imaging or diagnostic agents. In one embodiment, the diagnostic agent is barium sulfate. Other radioactive materials or magnetic materials can be used in place of, or in addition to, radio-opaque imaging materials. Examples of other materials include gases or gas-emitting compounds.

In some embodiments, bioactive agents can be present alone or in combination with other bioactive agents, carrier, excipients, diluents, fillers, or other pharmaceutically acceptable materials.

In some embodiments, the bioactive agent is bonded to the nanoparticle composition covalently. In another embodiment, the bioactive agent is encapsulated within the nanoparticle composition.

In the most preferred embodiment, the nanoparticle composition includes a chemotherapeutic, or anti-cancer agent, such as vinca alkaloids, agents that disrupt microtubule function (microtubule stabilizers and destabilizers), anti-angiogenic agents, tyrosine kinase targeting agent (such as tyrosine kinase inhibitors), transitional metal complexes, proteasome inhibitors, antimetabolites (such as nucleoside analogs), alkylating agents, platinum-based agents, anthracycline antibiotics, topoisomerase inhibitors, macrolides, therapeutic antibodies, retinoids (such as all-trans retinoic acids or a derivatives thereof); geldanamycin or a derivative thereof (such as 17-AAG), and other standard chemotherapeutic agents well recognized in the art. Examples include adriamycin, colchicine, cyclophosphamide, actinomycin, bleomycin, duanorubicin, doxorubicin, epirubicin, mitomycin, methotrexate, mitoxantrone, fluorouracil, carboplatin, carmustine (BCNU), methyl-CCNU, etoposide, interferons, camptothecin and derivatives thereof, phenesterine, taxanes and derivatives thereof (e.g., paclitaxel and derivatives thereof, taxotere and derivatives thereof, and the like), topetecan, vinblastine, vincristine, tamoxifen, piposulfan, nab-5404, nab-5800, nab-5801, Irinotecan, HKP, Ortataxel, vinorelbine, Tarceva, Neulasta, Lapatinib, Sorafenib, Navelbine (vinorelbine), anthracycline (Doxil), lapatinib (GW57016), Herceptin, gemcitabine (Gemzar), capecitabine (Xeloda), Alimta, cisplatin, 5-fluorouracil, epirubicin, cyclophosphamide, Avastin, Velcade, and derivatives thereof. In some embodiments, the chemotherapeutic agent is an antagonist of other factors that are involved in tumor growth, such as EGFR, ErbB2 (also known as Herb), ErbB3, ErbB4, or TNF.

A bioactive agent can be homogeneously dispersed in the form of fine particles within the nanoparticulate material. In another embodiment, the bioactive agent is partially solubilized in molten carrier material or partially dissolved with the carrier material in a mutual solvent during the formulation of the nanoparticle composition. In another embodiment, the bioactive agent is completely solubilized in the molten carrier material or completely dissolved with the carrier material in a co-solvent during the formulation of the nanoparticle composition. This is accomplished through the selection of materials and the manner in which they are processed.

Proteins which are water insoluble, such as zein, are preferred carrier materials for the formation of nanoparticle compositions containing a bioactive agent. Additionally, proteins, polysaccharides and combinations thereof which are water soluble can be formulated with a bioactive agent into nanoparticle compositions and subsequently cross-linked to form an insoluble network. For example, cyclodextrins can be complexed with individual bioactive molecules and subsequently cross-linked.

Certain polymers may also be used as carrier materials in the formulation of bioactive agent containing nanoparticle compositions. Suitable polymers include ethylcellulose and other natural or synthetic cellulose derivatives. Polymers which are slowly soluble and form a gel in an aqueous environment, such as hydroxypropyl methylcellulose or polyethylene oxide may also be suitable as carrier materials for nanoparticle compositions containing a bioactive agent.

Encapsulation or incorporation of drug into carrier materials to produce bioactive agent containing nanoparticle compositions can be achieved through known pharmaceutical formulation techniques. To create a composition that protects the bioactive agent from exposure upon mechanical disruption (e.g., grinding, chewing, or chopping), the bioactive agent is intimately dispersed within the carrier material. In the case of formulation in fats, waxes or wax-like materials, the carrier material is heated above its melting temperature and the bioactive agent is added to form a mixture comprising bioactive particles suspended in the carrier material, bioactive particles dissolved in the carrier material, or a mixture thereof. Nanoparticle compositions can be subsequently formulated through several methods including, but not limited to, the processes of congealing, extrusion, spray chilling or aqueous dispersion. In a preferred process, wax is heated above its melting temperature, drug is added, and the molten wax-drug mixture is congealed under constant stirring as the mixture cools. Alternatively, the molten wax-drug mixture can be extruded and spheronized to form pellets or beads. Detailed descriptions of these processes can be found in "Remington—The science and practice of pharmacy", 20th Edition, Jennaro et. Al., (Phila, Lippencott, Williams, and Wilkens, 2000).

For some carrier materials it may be desirable to use a solvent evaporation technique to produce bioactive agent containing nanoparticle compositions. In this case the bioactive agent and carrier material are co-dissolved in a mutual solvent and nanoparticles can subsequently be produced by several techniques including, but not limited to, forming an emulsion in water or other appropriate media, spray drying or by evaporating off the solvent from the bulk solution and milling the resulting material.

In another embodiment, the bioactive agent is covalently attached to the nanoparticle composition. Covalent attachment to the nanoparticle composition can be via any linker which is susceptible to hydrolysis in vivo such the non-exclusive list including anhydrides, esters, carbamates, amides, hydrazones, hydrazines, carbazides, semicarbazides, thiosemicarbazides, thiocarbazides and combinations thereof. Those skilled in the art will recognize that whether a linker is required, and the identity of the linker will depend on the composition of the nanoparticle and the bioactive agent.

In some embodiments, nanoparticle compositions include a targeting agent on the nanoparticle surface. Targeting agents are specific for a particular cell type, tissue, or organ within an organism. Targeting agents can be synthetic or biologic agents. The biologic, synthetic, or other targeting agent on the surface of the nanoparticle directs the nanoparticle specifically to cells of interest which are to be treated with the bioactive agent.

In one embodiment, the targeting agent is an antibody, preferably specific for a protein or receptor which binds to a tumor cell or tumor-associated tissue. The antibody can be monoclonal, polyclonal, antibody fragments. Examples of antibody fragments include Fab, Fab', F(ab)$_2$, scFv, Fv, dsFv diabody, or Fd fragments. Exemplary tumor-specific antibodies include anti-HER-2 antibody for targeting breast cancer cells, anti-A33 antigen antibody for targeting colon or gastric cancer, anti-human carcinoembryonic antigen (CEA) antibody for targeting carcinomas, HMFG2 or H17E2 antibodies for targeting breast cancer, and bispecific monoclonal antibodies composed of an anti-histamine-succinyl-glycine Fab' covalently coupled with an Fab' of either an anticarcinoembryonic antigen or an anticolon-specific antigen-p antibody.

In another embodiment, the targeting agent is a small molecule. A number of receptors are over-expressed on the surfaces of cancer cells or cancer-associated tissues which bind small molecule ligands. Non-limiting examples of receptors over-expressed on cancer cells include folk acid (folate) receptors and Factor VIIa. Conjugation of folic acid (folate) or the Factor VIIa ligand to a nanoparticle composition delivers the compositions to cancer cells, upon which internalization by receptor-mediated endocytosis can occur. The contents of the nanoparticle composition are released upon treatment with the promoter.

In another embodiment, the targeting agent is a nucleic acid ligand aptamer. Aptamers are DNA or RNA oligonucleotides or modified DNA or RNA oligonucleotides which fold into unique conformations specific to satisfy a particular target-ligand binding conformation. Non-limiting examples of aptamers include aptamers that bind to vascular endothelial grown factor (VEGF) and prostate specific membrane antigen (PSMA).

In another embodiment, the targeting agent is an oligopeptide which is specific for a receptor selected from the non-exclusive list including cell surface hormone receptors, tumor vasculature agents, and integrins.

Protocols for carrying out covalent attachment of targeting agents are routinely performed by the skilled artisan. For example, conjugation can be carried out by reacting thiol derivatized targeting agent with the nanoparticle composition. Alternatively, the targeting agents are derivatized with a linker, wherein the linker can further include a chain of ethylene groups, a peptide or amino acid groups, polynucleotide or nucleotide groups which can be degraded in vivo.

D. Excipients

Suitable pharmaceutically acceptable carriers include talc, gum Arabic, lactose, starch, magnesium stearate, cocoa butter, aqueous or non-aqueous vehicles, fatty substances of animal or vegetable origin, paraffin derivatives, glycols, various wetting, dispersing or emulsifying agents and preservatives.

For injection, the lactones will typically be formulated as solutions or suspensions in a liquid carrier.

In some embodiments, nanoparticle compositions are prepared using a pharmaceutically acceptable "carrier" composed of materials that are considered safe and effective and may be administered to an individual without causing undesirable biological side effects or unwanted interactions. The "carrier" is all components present in the pharmaceutical formulation other than the active ingredient or ingredients.

The term "carrier" includes, but is not limited to, diluents, binders, lubricants, desintegrators, fillers, and coating compositions.

"Carrier" also includes all components of the coating composition which may include plasticizers, pigments, colorants, stabilizing agents, and glidants. The delayed release dosage formulations may be prepared as described in references such as "Pharmaceutical dosage form tablets", eds. Liberman et. at (New York, Marcel Dekker, Inc., 1989), "Remington—The science and practice of pharmacy", 20th ed., Lippincott Williams & Baltimore, Md., 2000, and "Pharmaceutical dosage forms and drug delivery systems", 6th Edition, Ansel et. al., (Media, Pa.: Williams and Wilkins, 1995) which provides information on carriers, materials, equipment and process for preparing tablets and capsules and delayed release dosage forms of tablets, capsules, and granules.

Examples of suitable coating materials include, but are not limited to, cellulose polymers such as cellulose acetate phthalate, hydroxypropyl cellulose, hydroxypropyl methylcellulose, hydroxypropyl methylcellulose phthalate and hydroxypropyl methylcellulose acetate succinate; polyvinyl acetate phthalate, acrylic acid polymers and copolymers, and methacrylic resins that are commercially available under the trade name Eudragit® (Roth Pharma, Westerstadt, Germany), Zein, shellac, and polysaccharides.

Additionally, the coating material may contain conventional carriers such as plasticizers, pigments, colorants, glidants, stabilization agents, pore formers and surfactants.

Optional pharmaceutically acceptable excipients present in the drug-containing compositions include, but are not limited to, diluents, binders, lubricants, disintegrants, colorants, stabilizers, and surfactants. Diluents, also termed "fillers," are typically necessary to increase the bulk of a solid dosage form so that a practical size is provided for compression. Suitable diluents include, but are not limited to, dicalcium phosphate dihydrate, calcium sulfate, lactose, sucrose, mannitol, sorbitol, cellulose, microcrystalline cellulose, kaolin, sodium chloride, dry starch, hydrolyzed starches, pregelatinized starch, silicone dioxide, titanium oxide, magnesium aluminum silicate and powder sugar.

Binders are used to impart cohesive qualities to a solid nanoparticle formulation. Suitable binder materials include, but are not limited to, starch, pregelatinized starch, gelatin, sugars (including sucrose, glucose, dextrose, lactose and sorbitol), polyethylene glycol, waxes, natural and synthetic gums such as acacia, tragacanth, sodium alginate, cellulose, including hydroxypropylmethylcellulose, hydroxypropylcellulose, ethylcellulose, and veegum, and synthetic polymers such as acrylic acid and methacrylic acid copolymers, methacrylic acid copolymers, methyl methacrylate copolymers, aminoalkyl methacrylate copolymers, polyacrylic acid/polymethacrylic acid and polyvinylpyrrolidone.

Lubricants can also be used in the nanoparticle composition. Examples of suitable lubricants include, but are not limited to, magnesium stearate, calcium stearate, stearic acid, glycerol behenate, polyethylene glycol, talc, and mineral oil.

Disintegrants are used to facilitate dosage form disintegration or "breakup" after administration, and generally include, but are not limited to, starch, sodium starch glycolate, sodium carboxymethyl starch, sodium carboxymethylcellulose, hydroxypropyl cellulose, pregelatinized starch, clays, cellulose, alginine, gums or cross linked polymers, such as crosslinked PVP (Polyplasdone XL from GAF Chemical Corp).

Stabilizers are used to inhibit or retard drug decomposition reactions which include, by way of example, oxidative reactions.

Surfactants may be anionic, cationic, amphoteric or nonionic surface active agents. Suitable anionic surfactants include, but are not limited to, those containing carboxylate, sulfonate and sulfate ions. Examples of anionic surfactants include sodium, potassium, and ammonium salts of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine. Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-β-alanine, sodium N-lauryl-β-iminodipropionate, myristoamphoacetate, lauryl betaine and lauryl sulfobetaine.

If desired, the nanoparticle compositions may also contain minor amount of nontoxic auxiliary substances such as wetting or emulsifying agents, dyes, pH buffering agents, and preservatives.

E. Methods of Administration

In some embodiments, the nanoparticle compositions are administered by any standard method including topical, enteral, or parenteral administration. Topical methods of administration include epicutaneous, inhalational, enema, eye or ear drop, and transmucosal. Enteral administration include including oral dosing, feeding tube, or suppository. Parenteral forms of administration include intravenous injection, intraarterial injection, intramuscular injection, intraperitoneal injection, and subcutaneous injection.

In another embodiment, a reservoir device or cavity capable of a slow release of the nanoparticle composition can also be administered by the above-listed methods. In the preferred embodiment, the nanoparticle is injected into a specific tissue or organ before treatment. In the most preferred embodiment, the nanoparticle composition is injected into a cancerous tissue or organ before treatment. Administration of the nanoparticle composition does not result in released bioactive agent due to degradation within the GI tract, degradation by enzymes or acids, or mechanical erosion.

The nanoparticle composition can be administered to a patient to treat, prevent, and detect a biological disease or disorder by delivering bioactive agents to a cell, tissue, or organ. The nanoparticle composition can be administered systemically or locally. Similarly, the energy of dissociation can be applied globally or locally. Those skilled in the art will recognize the specific combination of method of administration and energy of dissociation treatment will depend on the patient, dosage required, disease or disorder, and other factors.

In one embodiment, the nanoparticle composition is administered to a patient systemically, and energy of dissociation treatment occurs globally. In another embodiment, a nanoparticle composition is administered to a patient systemically and energy of dissociation treatment occurs locally.

Specificity for a target tissue or organ is obtained by treatment with the energy of dissociation at the site, tissue, or organ of interest. The targeting agent is specific for the cell, tissue, or organ of interest, and directs the nanoparticle composition to the appropriate location. In some embodiments, the nanoparticle compositions will be endocytosed by cells. In the preferred embodiment, the nanoparticle composition is administered locally, via injection for example, and energy of dissociation treatment occurs locally via a non-invasive energetic energy of dissociation source, such as ultrasound applied to the abdomen.

In all of the above-identified embodiments, treatment with the energy of dissociation results in nanoparticle composition dissociation into component products such that the bioactive agents are released into the surrounding medium to act via the normal mechanism of action.

In some embodiments, the process can be used to deliver drugs to treat or prevent disease. In one embodiment, the process can be used to deliver contrast or other imaging agents for detection or imaging purposes. Examples of medical imaging techniques include X-ray imaging, ultrasound imaging, magnetic resonance imaging (MRI), nuclear imaging, positron emission tomography (PET), radiography, fluoroscopy, and computed tomography (CT).

The following example is included to demonstrate a preferred embodiment of the invention. While the processes and uses have been described in terms of preferred embodiments, it will be apparent to those of skill in the art that variations may be applied to the composition, methods and in the steps or in the sequence of steps of the method described herein without departing from the concept, spirit and scope of the invention.

EXAMPLE

Example 1

Photocatalytic Generation of $N_2$ from $NH_3$
Photocatalysis

A pulse of light of a particular frequency and intensity of a quick duration (nano or pico-second burst or similar duration providing a multi-photon discharge) is used to photodissociate ammonia to nitrogen and hydrogen with no production of any intermediates or oxidized by-products such as nitrate, nitrite or nitrous oxide. This is accomplished by the use of the correct promoter, light frequency energy and/or specific input of the correct bond dissociation energy or energies for ammonia with a proper intensity which provides for a multiphoton or frequency energy exposure of the ammonia molecule. A particular molecular bond having a precise energy of bond or dissociation in each target molecule is broken by photo-dissociation, only due to the light pulse being at the proper frequency and intensity with the proper number of photons attached within the necessary time to prevent reconnection, thereby producing harmless nitrogen and hydrogen, thereby removing the harmful ammonia from the water. A benefit of this process is that the off gases or cleaved atoms can be collected and used as energy sources as is in the situation with hydrogen in a fuel cell or hydride engine or as a nutrient.

Materials and Methods

A three ounce solution of 1 ppm ammonia in water was irradiated with a xenon curing bulb attached to a pulse generator which supplied 3 pulses per second. Optionally, one of the following catalysts were included: $Pt/TiO_2$ (platinized titanic), $TiO_2$ (Titanium oxide), Cu-AMO (Copper-doped Amorphous Manganese Oxide, AMO (Amorphous Manganese Oxide), and Cu—Ce—Co (Copper-Cerium-Cobalt). The xenon curing bulb was set to the low ultraviolet range from 185 nm to 280 nm. The solutions were tested for component gases after one second and one minute. The resultant gases of dissociation, $N_2$ (g) and $H_2$ (g), were measured by gas chromatography (GC), mass spectrometry (MS), ion chromatography, and gas chromatography-mass spectrometry (GC-MS) methods. Separation and determination of ammonia ($NH_3$), nitrite ($NO_2^-$) and nitrate ($NO_3$.) in single sample solutions was performed as follows:

1. $NH_4^+$ was converted to $NH_3$ in solution using NaOH.
2. $NH_3$ was reduced to $NO_2^-$ using $FeSO_4$.
3. $NO_2^-$ was oxidized to $NO_3^-$ using Al—Cu—Zn (Devarda's alloy)

Results

Preliminary results for the degradation of ammonia in water are shown below in Tables 1-3. The products were analyzed by gas chromatography (GC), mass spectrometry (MS), ion chromatography, and gas chromatography-mass spectrometry (GC-MS) methods.

TABLE 1

Generation of $N_2$ from $NH_3$ via Photocatalysis

| Sample | Trial | $O_2$ peak area | $N_2$ peak area | Total Peak Area | $N_2$ Peak Ratio[a] | Peak Ratio[b] |
|---|---|---|---|---|---|---|
| 100% $N_2$ | 1 | 0 | 1557.491 | 1557.491 | 1.00 | 0 |
|  | 2 | 2.3732 | 1557.4989 | 16013 | 0.972 | 656.286 |
| Air | 1 | 149.2122 | 609.9426 | 759.1548 | 0.803 | 4.087 |
|  | 2 | 58.9228 | 236.4986 | 295.4214 | 0.800 | 4.013 |
| Blank[c] | 1 | 9.0868 | 32.8381 | 41.9249 | 0.783 | 3.613 |
|  | 2 | 2.9284 | 9.2394 | 12.1678 | 0.759 | 3.150 |
| Platinized $TiO_2$ | Day 1 | 115.4792 | 552 | 679.3385 | 0.813 | 4.782 |
|  | Day 2, Trial 1 | 5.0618 | 23.9787 | 39.1785 | 0.612 | 4.737 |
|  | Day 2, Trial 2 | 5.5956 | 25.2047 | 30.8003 | 0.818 | 4.504 |

[a]$N_2$ Peak Ratio = ($N_2$ Peak Area/Total Peak Area)
[b]Peak Ratio = ($N_2$ Peak Area/$O_2$ Peak Area)
[c]$O_2$ and $N_2$ peaks observed are attributed to sample contamination with air due to the limitation of manual injection despite precautions. Online injection avoids this contamination.
Trial 1 = 1 second; Trial 2 = 1 minute

TABLE 2

Photocatalytic Data for Various Photocatalysts[a]

| Catalyst | Trial | $NH_3$ | $NO_2^-$ | $NO_3^-$ |
|---|---|---|---|---|
| Platinized | 1 | 0.0574 | 0.0125 | 0.0137 |
| $TiO_2$ | 2 | 0.0574 | 0.0123 | 0.0135 |
|  | 3 | 0.0572 | 0.0122 | 0.0134 |
|  | Average | 0.0573 | 0.0123 | 0.0135 |
| $TiO_2$ | 1 | 0.1547 | 0.0101 | 0 |
|  | 2 | 0.1548 | 0.0106 | 0 |
|  | 3 | 0.1550 | 0.0108 | 0 |
|  | Average | 0.1548 | 0.0105 | 0 |
| Cu-AMO | 1 | 0.1322 | 0 | 0 |
|  | 2 | 0.132 | 0 | 0 |
|  | 3 | 0.1318 | 0 | 0 |
|  | Average | 0.132 | 0 | 0 |
| AMO | 1 | 0.736 | 0 | 0 |
|  | 2 | 0.7358 | 0 | 0 |
|  | 3 | 0.7356 | 0 | 0 |
|  | Average | 0.7358 | 0 | 0 |
| Co—Ce—Cu | 1 | 0.3926 | 0 | 0 |
|  | 2 | 0.3924 | 0 | 0 |
|  | 3 | 0.3922 | 0 | 0 |
|  | Average | 0.3924 | 0 | 0 |

[a]Units are in Absorbance Units

TABLE 3

$NH_3$ Concentrations following Photocatalysis with Various Catalysts

| Catalyst | Average Calculated $NH_3$ Concentration Following Photocatalysis (mM) | Percent Decrease from Starting $NH_3$ Concentration (%) |
|---|---|---|
| None | 0.19 | 0 |
| Platinized Titania | 0.029 | 84.6 |
| $TiO_2$ | 0.080 | 57.5 |
| Cu-AMO | 0.068 | 63.9 |
| AMO | 0.388 | −104.2 |
| Cu—Ce—Co | 0.206 | −8.93 |

DISCUSSION

Figure 1:
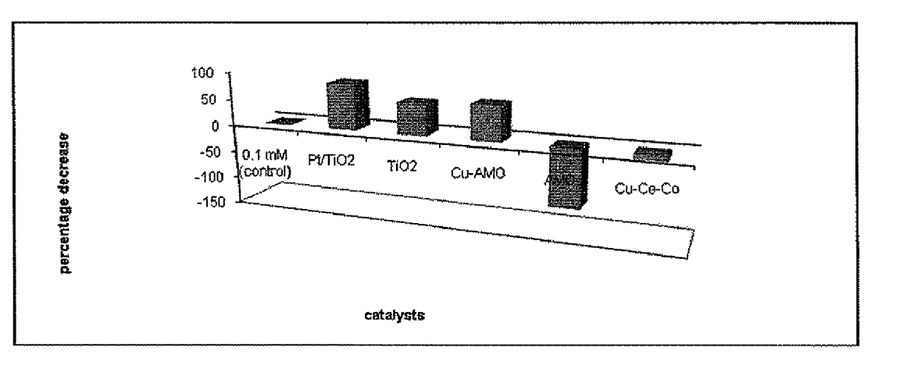
FIG. 1 is a bar graph of the percentage decrease of aqueous ammonia after photocatalytic degradation. The results are achieved with the following catalysts: Pt/TiO2 (platinized titania), TiO2 (Titanium oxide), Cu-AMO (Copper-doped Amorphous Manganese Oxide, AMO (Amorphous Manganese Oxide), and Cu—Ce—Co (Copper-Cerium-Cobalt).

From Tables 1-3 and FIG. 1, a significant decrease in $NH_3$ concentration in $Pt/TiO_2$ from 0.1 mM to 0.029 mM is observed. This is an indication of the conversion of ammonia to other nitrogen-containing species. The photocatalytic activity of AMO is impressive. However, the data clearly indicate photocatalytic oxidation of $NH_3$ in aqueous solution to the undesirable toxic nitrate and nitrite oxygenated products. Doping the AMO with copper ($Cu^{2+}$ ions) markedly increased the selectivity for 100% conversion of ammonia to nitrogen gas.

We claim:

1. A process for dissociation of one or more target molecules, comprising
   (a) treating a material comprising target molecules with an effective amount, intensity, and frequency of energy to specifically dissociate one or more target bonds in the target molecules to separate the target molecules into their component products without producing any byproducts and without re-association of the one or more target bonds.

2. The process of claim 1, wherein the energy is selected from the group consisting of chemical, kinetic, potential, magnetic, thermal, sound, light, electrical, piezoelectric, and electrochemical energy.

3. The process of claim 1, wherein the energy is in the form of light irradiation, acoustic energy, or electromagnetic radiation.

4. The process of claim 3, wherein the energy is amplified.

5. The process of claim 1, wherein the energy is supplied by an energy source is selected from the group consisting of frequency generators, electrical generators, plasma generators, arc lamps, pulse generators, amplifying generators, tunable lasers, ultraviolet lamps, ultraviolet lasers, pulse ultraviolet generators, ultrasound generators, and combinations thereof.

6. The process of claim 1, comprising providing a catalyst.

7. The process of claim 6, wherein the catalyst is a semiconductive material or magnetic material.

8. The process of claim 6, where in the catalyst is selected from the group consisting of titanium oxides ($TiO_2$), platinized titania, amorphous manganese oxide, copper-doped manganese oxide, titanium dioxide, strontium titanate, barium titanate, sodium titanate, cadmium sulfide, zirconium dioxide, and iron oxide.

9. The process of claim 6, wherein the catalyst is a semiconductor material selected from the group consisting of platinum, palladium, rhodium, and ruthenium, strontium titanate, amorphous silicon, hydrogenated amorphous silicon, nitrogenated amorphous silicon, polycrystalline silicon, germanium, and combinations thereof.

10. The process of claim 6, wherein the catalyst is selected from the group consisting of carbon-based graphene or graphite, carbon-doped semi-conductive material, or carbon-doped magnetic material.

11. The process of claim 1, wherein the energy is irradiative energy, and a catalyst is provided.

12. The process of claim 11, wherein the energy is ultraviolet irradiation and the catalyst is copper doped amorphous manganese oxide.

13. The process of claim 1, wherein the target molecules are selected from the group consisting of alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, medicines, methane, nitric acid, nitrogen dioxide, nitrates, nitrites, ozone, pesticides, polychlorinated biphenyls, oil, sulfur dioxide, sulfuric acid and volatile organic compounds.

14. The process of claim 1, wherein the target molecules are waste material.

15. The process of claim 14, wherein the waste material is selected from the group consisting of ventilation makeup air, ambient air, air from stripping and off-gassing operations, soil vapor extraction (SVE), airborne matter, organic particulate matter, process vent gas, wastewater treatment off-gas, liquid effluents, wastewater, industrial runoff, and agricultural runoff, polluted soil, sludge waste, and landfill waste.

16. The process of claim 1, further comprising
   (b) purifying, recycling or reclaiming the component products.

17. The process of claim 1, further comprising
   (c) using at least one component product to produce energy.

18. The process of claim 1, wherein the target molecules are ammonia.

19. The process of claim 18, wherein the ammonia originates from urine, fertilizer, or aquacultural waste products.

20. The process of claim 19, wherein hydrogen gas is produced.

21. The process of claim 1, wherein the target molecules are polychlorinated biphenyls (PCBs).

22. The process of claim 1, wherein the target molecules are therapeutic, prophylactic or diagnostic agents.

23. The process of claim 22, wherein the target molecules are chemotherapeutics for treatment of cancer or infectious agents.

24. The process claim 23, wherein the target molecules are incorporated onto, into or forms a nanoparticle.

25. The process of claim 24, wherein the nanoparticle comprises a metal.

26. A system for use in the method of claim 1, comprising
a container for a material comprising target molecules to be dissociated, and
an energy source that provides an effective amount, intensity, and frequency of energy to specifically dissociate one or more target bonds in the target molecules to separate the target molecules into their component products without producing any by-products and without re-association of the one or more target bonds,
wherein the energy source is positioned to transfer the energy to the target molecules.

27. The process of claim 14, wherein the waste material is contaminated water on a submarine or ship.

28. The process of claim 5, wherein the energy source is a pulsed light source.

29. The process of claim 1, wherein the target molecules are proteins, polysaccharides, or oligonucleotides of infectious agents, cells, bacteria, microorganisms, or other living organisms.

* * * * *